US008595375B1

(12) United States Patent
Kuznetsov

(10) Patent No.: US 8,595,375 B1
(45) Date of Patent: Nov. 26, 2013

(54) SEGMENTING VIDEO BASED ON TIMESTAMPS IN COMMENTS

(75) Inventor: Stacey Kuznetsov, Pittsburgh, PA (US)

(73) Assignee: Google Inc., Mountain View, CA (US)

(*) Notice: Subject to any disclaimer, the term of this patent is extended or adjusted under 35 U.S.C. 154(b) by 233 days.

(21) Appl. No.: 13/172,672

(22) Filed: Jun. 29, 2011

Related U.S. Application Data

(62) Division of application No. 12/266,476, filed on Nov. 6, 2008.

(51) Int. Cl.
*G06F 15/16* (2006.01)
*H04L 29/06* (2006.01)
*G06F 17/24* (2006.01)
*H04L 29/08* (2006.01)

(52) U.S. Cl.
CPC ........ *H04L 29/06027* (2013.01); *G06F 17/246* (2013.01); *H04L 29/08072* (2013.01); *H04L 29/06* (2013.01)
USPC ........... 709/231; 709/219; 709/227; 715/719; 715/720; 715/716

(58) Field of Classification Search
USPC ......... 725/14, 34, 37, 45, 46, 76, 86, 90, 109, 725/114; 709/203, 219, 227, 231; 1/1; 715/114, 229, 716, 723, 753, 719–720; 386/228, 232, 241, 250; 707/769, 804, 707/812, 999.1, E17.11; 382/240
See application file for complete search history.

(56) References Cited

U.S. PATENT DOCUMENTS

| | | | |
|---|---|---|---|
| 6,230,162 B1 * | 5/2001 | Kumar et al. ................. | 382/240 |
| 6,332,144 B1 * | 12/2001 | deVries et al. ........................ | 1/1 |
| 6,496,980 B1 * | 12/2002 | Tillman et al. .................. | 725/90 |
| 7,257,774 B2 * | 8/2007 | Denoue et al. ................ | 715/719 |
| 7,260,564 B1 * | 8/2007 | Lynn et al. ............................ | 1/1 |
| 8,332,530 B2 * | 12/2012 | Wei et al. ....................... | 709/231 |
| 2001/0023436 A1 * | 9/2001 | Srinivasan et al. ............ | 709/219 |
| 2002/0053078 A1 * | 5/2002 | Holtz et al. ..................... | 725/14 |
| 2004/0078470 A1 * | 4/2004 | Baumeister et al. .......... | 709/227 |
| 2007/0055986 A1 * | 3/2007 | Gilley et al. .................... | 725/34 |
| 2007/0255844 A1 * | 11/2007 | Shen et al. ..................... | 709/231 |
| 2008/0155631 A1 * | 6/2008 | Liwerant et al. .............. | 725/114 |
| 2009/0055399 A1 * | 2/2009 | Lu et al. .......................... | 707/10 |

* cited by examiner

*Primary Examiner* — Wing F Chan
*Assistant Examiner* — Raji Krishnan
(74) *Attorney, Agent, or Firm* — Fenwick & West LLP

(57) ABSTRACT

A system, method, and computer program product are provided for segmenting videos in a video hosting service. To determine segments related to timestamps, user generated comments are parsed for timestamps. The timestamps are organized into sets and a segment is identified for each set of timestamps. A start point for each segment is determined based on the timestamps in each set. The segment will have an endpoint that can be either the end of the itself, or optionally can be determined based on the timestamps. Each timestamp is associated with a segment. One or more indicators represent each timestamp and each indicator is coupled to the segment associated with timestamp represented by the indicator. The segments are ranked according to popularity or the submission time of their related timestamp indicators. Responsive to receiving a client request for a video, the comments, indicators, and segments are loaded to the client.

34 Claims, 6 Drawing Sheets

SEGMENTING VIDEO BASED ON TIMESTAMPS IN COMMENTS

CROSS-REFERENCE TO RELATED PATENT APPLICATION

This application is a divisional of U.S. application Ser. No. 12/266,476, filed Nov. 6, 2008, which is incorporated by reference in its entirety.

TECHNICAL FIELD

The disclosed embodiments relate generally to the management and display of videos and comments for video segments.

BACKGROUND

The proliferation of video sharing through video hosting services provides numerous opportunities to collaborate and experience videos in online communities. Video hosting services allow users to upload, view, comment on and rate videos. Users browsing a video hosting service can locate videos of interest by, for example, searching for videos, browsing directories, or sorting by ratings.

Most video hosting services provide a comment field interface by which users can provide comments about a video. Typically, a comment field is associated with the entire video, rather than any specific portion. If a user wants to direct others to a specific portion of the video, the user has to manually enter some text indicating the time offset associated with their comments. For example, the user would enter a comment such as "See the video at 01:48", which tells other users to view the video at 1 minute and 48 seconds. To see what content of the video the user is referring to in this example, other users have to manually control the video player to seek to the suggested 1 minute, 48 second time offset to view the video from there and understand the comment. In most video hosting service, attempting to seek to a specific time offset requires the user to wait for the entire video to load into the user's video player. The time required for the video to load can be relatively long depending on a number of factors, such as the size of the video file, speed of the user's internet connection, or the speed of the user's computer. Thus, some users might choose forgo viewing the suggested video content in order to avoid waiting for the entire video to load.

This problem is further complicated because the user must also remember the suggested time offset while waiting for the video to load. Thus, some users who want to view the suggested video segment will be unable to do because they will not remember the suggested time offset.

SUMMARY

The present invention includes systems and methods for segmenting videos in a video hosting service. Users submit comments containing information about portions of videos stored in a video hosting service. For example, comments can be associated with a particular moment or scene in a video. Some of these comments will provide information about specific portions of the video using a timestamp. A timestamp is any data identifying time or a range of time within the video. The comments are parsed for a timestamp, either at the time the comments are submitted by the users, or at any time thereafter. The timestamps can be processed to identify the segments of video indicated by the timestamps. At a high level, identifying the segment of video identified by a timestamp involves determining at least a start point and a video segment.

For any given video, there may be a large number of comments containing timestamps. Some of these timestamps will refer to a common segment of video even though the timestamps may be different. For example, the timestamps "1:48" and "1:52" may refer to the same segment of video given that some action in the video occurs over several seconds, and different users may focus on different frames in the segment when submitting their comments. Accordingly, in one embodiment the timestamps for one or more comments are collected into sets, and a common start point of a segment of the video to associate with the set of timestamps is determined. The segment will also have an endpoint that can be either the end of the video itself, or optionally the end point of the segment can be determined based on the timestamps. Since every timestamp in a set of timestamps refers to a common segment of video, each timestamp in a set can have a common start point and a common end point. An index is created by associating the timestamps with a segment of the video. This process is repeated for various videos available on the video hosting site.

In another aspect, segmenting video based on timestamps beneficially enables prefetching segments of the video to a client. For example, when a user requests to play a given video, the video is loaded into a video player, and the segments of the video are prefetched as well, and loaded. As the video is playing the user can select an indicator associated with one of the segments, and the selected segment can be played immediately as a result of the prefetching. The user is thus able to view the segments associated with the comments, without having to unduly wait for the entire video to load into the player.

In one embodiment, a computer system manages videos and indicators via a number of server modules. A parsing module parses a comment associated with one or more segments of a video to identify timestamps in the comments. A segment identifying module forms sets of timestamps and identifies a start point and an end point for each segment that corresponds to each set. An indexing module creates an index by associating one or more indicators of a timestamp with a corresponding segment of video (either the start point, or the start point and the end point). A ranking module creates a ranking for the segment(s) of video. A display module loads the time bar, comment box, and user created comments to the user browser. The display module also loads an indicator of the timestamps to the user browser. The display module prefetches and loads the video to the user browser from the start point to the end point.

The features and advantages described in this summary and the following detailed description are not all-inclusive. Many additional features and advantages will be apparent to one of ordinary skill in the art in view of the drawings, specification, and claims presented herein.

The figures depict various embodiments of the present invention for purposes of illustration only. One skilled in the art will readily recognize from the following discussion that alternative embodiments of the structures and methods illustrated herein may be employed without departing from the principles of the invention described herein.

DESCRIPTION OF EMBODIMENTS

Figure 1:
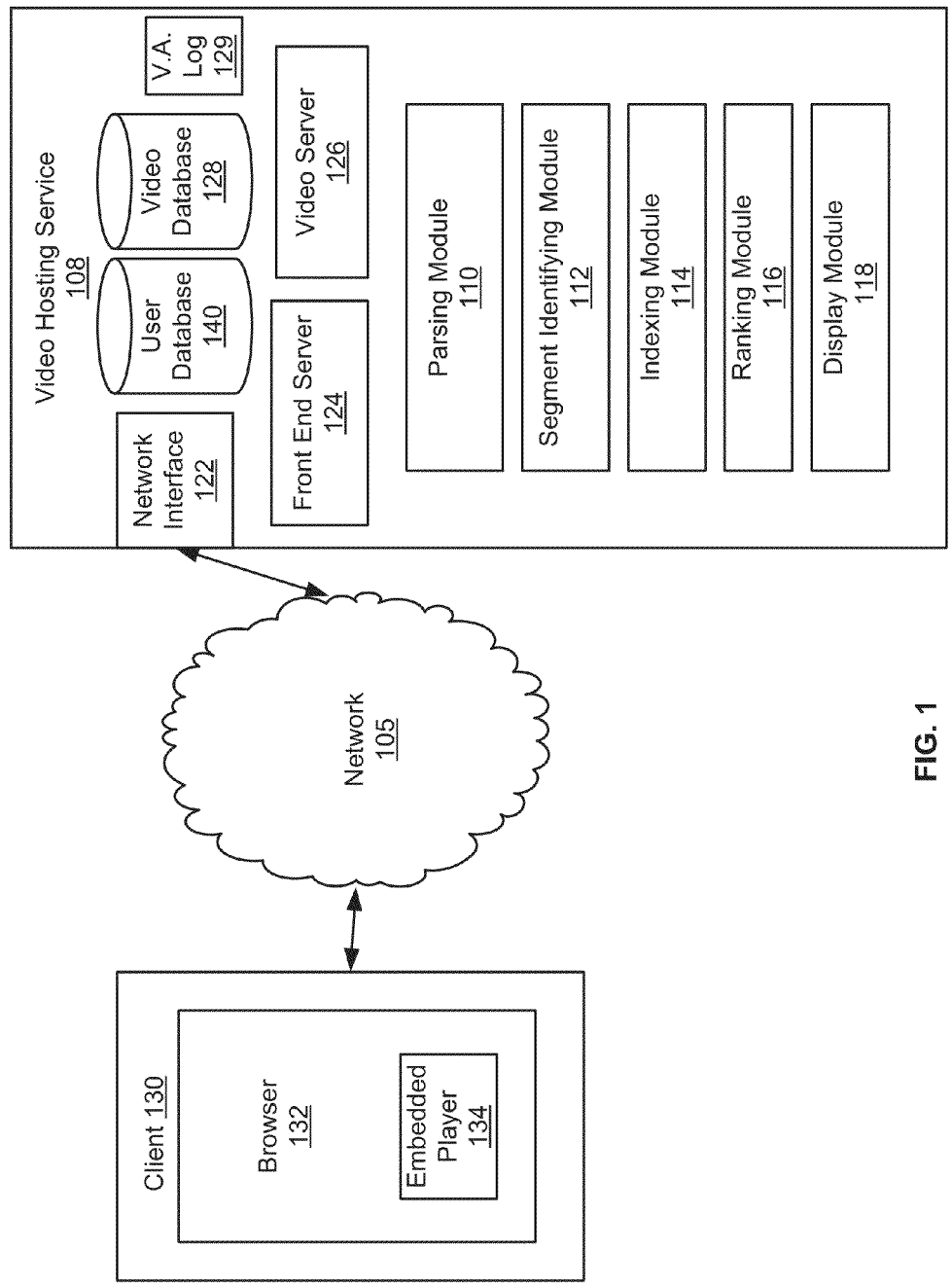
FIG. 1 is a block diagram of a system architecture for prefetching video segments in a video hosted service.

FIG. 1 is a block diagram of a system architecture in accordance with one embodiment. As illustrated in FIG. 1, a video hosting service 108 includes a front end server 124, a video server 126, a network interface 122, a parsing module 110, a segment identifying module 112, an indexing module 114, a ranking module 116, a display module 118, a video database 128, a video access log 129, and a user database 140. Other conventional features, such as firewalls, load balancers, application servers, failover servers, site management tools, and so forth are not shown so as to more clearly illustrate the features of the system. Examples of a suitable service 108 for implementation of the system include the YouTube™ and Google Video™ websites; other video hosting sites are known as well, and can be adapted to operate according to the teachings disclosed herein. It will be understood that the term "service" represents any system and method of providing content and is not intended to be limited to systems that support content provided via the Internet or the HTTP protocol. The various servers are conventionally implemented, whether as a single piece of software or hardware or as multiple pieces of software or hardware and can couple to the network 105 via the network interface 122. In general, functions described in one embodiment as being performed on the server side can also be performed on the client side in other embodiments if appropriate.

A client 130 executes a browser 132, and connects to the front end server 124 via a network 105, which is typically the Internet, but may also be any network, including but not limited to a LAN, a MAN, a WAN, a mobile, wired or wireless network, a private network, or a virtual private network. While only a single client 130 and browser 132 are shown, it is understood that very large numbers (e.g., millions) of clients are supported and can be in communication with the service 108 at any time. The client 130 may include a variety of different computing devices. Examples of client devices 130 are personal computers, digital assistants, personal digital assistants, cellular phones, mobile phones, smart phones or laptop computers. As will be obvious to one of ordinary skill in the art, the present invention is not limited to the devices listed above.

A user views, authors, and edits comments using a client 130. A comment includes comment content, which is any data which can usefully supplement a media file. For example, comment content can include a timestamp directing others to a segment of a media file. The clients 130 include software and hardware for displaying video.

For example, a client 130 can be implemented as a television, a personal computer, a digital video recorder (DVR), a personal digital assistant (PDA), a cellular telephone, or another device having or connected to a display device. The software included in client 130 does not have to be a web browser and includes any media player adapted to decode and playback media files, e.g., video files, such as MPEG-2, MPEG-4, QuickTime, VCD, or any other current or future video format. Other examples of clients will be apparent to one of skill in the art without departing from the scope of the present invention. Examples of a graphical user interface used by the client 130 according to one embodiment are described herein with references to FIGS. 2, 4, and 5.

A user can access a video from the video hosting service 108 by browsing a catalog of videos, conducting searches on keywords, reviewing play lists from other users or the system administrator (e.g., collections of videos forming channels), viewing videos associated with particular user group (e.g., communities), or any other way of accessing a video from the video hosting service 108.

Video server 126 receives uploaded media content from content providers and allows content to be viewed by client 130. Content may be uploaded to video server 126 via the Internet from a personal computer, through a cellular network from a telephone or PDA, or by other means for transferring data over network 105 known to those of ordinary skill in the art. Generally, content may be downloaded from video server 126 in a similar manner; in one embodiment media content is provided as a file download to a client 130; in an alternative embodiment, media content is streamed to client 130. The means by which media content is received by video server 126 need not match the means by which it is delivered to client 130. For example, a content provider may upload a video via a browser on a personal computer, whereas client 130 may view that video as a stream sent to a PDA. Note also that video server 126 may itself serve as the content provider. A description about prefetching content to a client 130 will be described below.

Users of clients 130 can also search for videos based on keywords, tags or other metadata. These requests are received as queries by the front end server 124 and provided to the video server 126, which is responsible for searching the video database 128 for videos that satisfy the user queries. The video server 126 supports searching on any fielded data for a video, including its title, description, tags, author, category and so forth. Responsive to a request from a client 130 for a comment associated with a particular media file, the video server 126 sends one or more comments associated with the media file to the client 130 through the network 105. Responsive to a submission by the client 130 of one or more comments associated with a media file, the video server 126 stores the one or more comments in association with the media file in user database 140.

Information about received comments is stored in the user database 140. The user database 140 is responsible for maintaining a record of all users viewing videos on the service. Each individual user is assigned a user ID. The user ID can be based on any identifying information, such as the user's IP address, user name, or the like. The user database may also contain information about the reputation of the user in both the video context, as well as through other applications, such as the use of email or text messaging.

Users of the clients 130 and browser 132 can upload content to the video hosting service 108 via network 105. The uploaded content can include, for example, video, audio or a combination of video and audio. The uploaded content is processed and stored in the video database 128. This processing can include format conversion (transcoding), compression, metadata tagging, and other data processing. An uploaded content file is associated with the uploading user, and so the user's account record is updated in the user database 140 as needed. For purposes of convenience and the description of one embodiment, the uploaded content will be referred to as "video", "segment of video", or "segment", but no limitation on the types of content that can be uploaded are intended by this terminology. Each uploaded video is assigned a video identifier when it is processed.

The video database 128 is used to store the received videos. The video database 128 stores video content and associated metadata, provided by their respective content owners. The video files have metadata associated with each file such as a video ID, artist, video title, label, genre, and time length. An access log 129 associated with video database 128 stores each instance of video access.

A user can submit a comment by clicking a "submit button", or any other means of submitting user comments to the video hosting service 108. For purposes of convenience and the description of one embodiment, comments will be described below as being submitted by clicking a submit button.

Each entry in the access log 129 identifies a video being accessed, a time of access, an IP address of the user, a user ID if available, cookies, search queries, data identifying the type of interaction with the video, and the time of every interaction with the video. Interaction types can include any user interactions in the user interface of the service 108, such as playing, pausing, rewinding, forwarding and submitting comments or ratings for a video. A log processor (not shown) can perform various types of data mining and statistical analysis on the access log 129. Alternatively, the data stored in access log 129 can be accessed by a software module, server, database, or any other device for data mining and statistical analysis.

Figure 2:
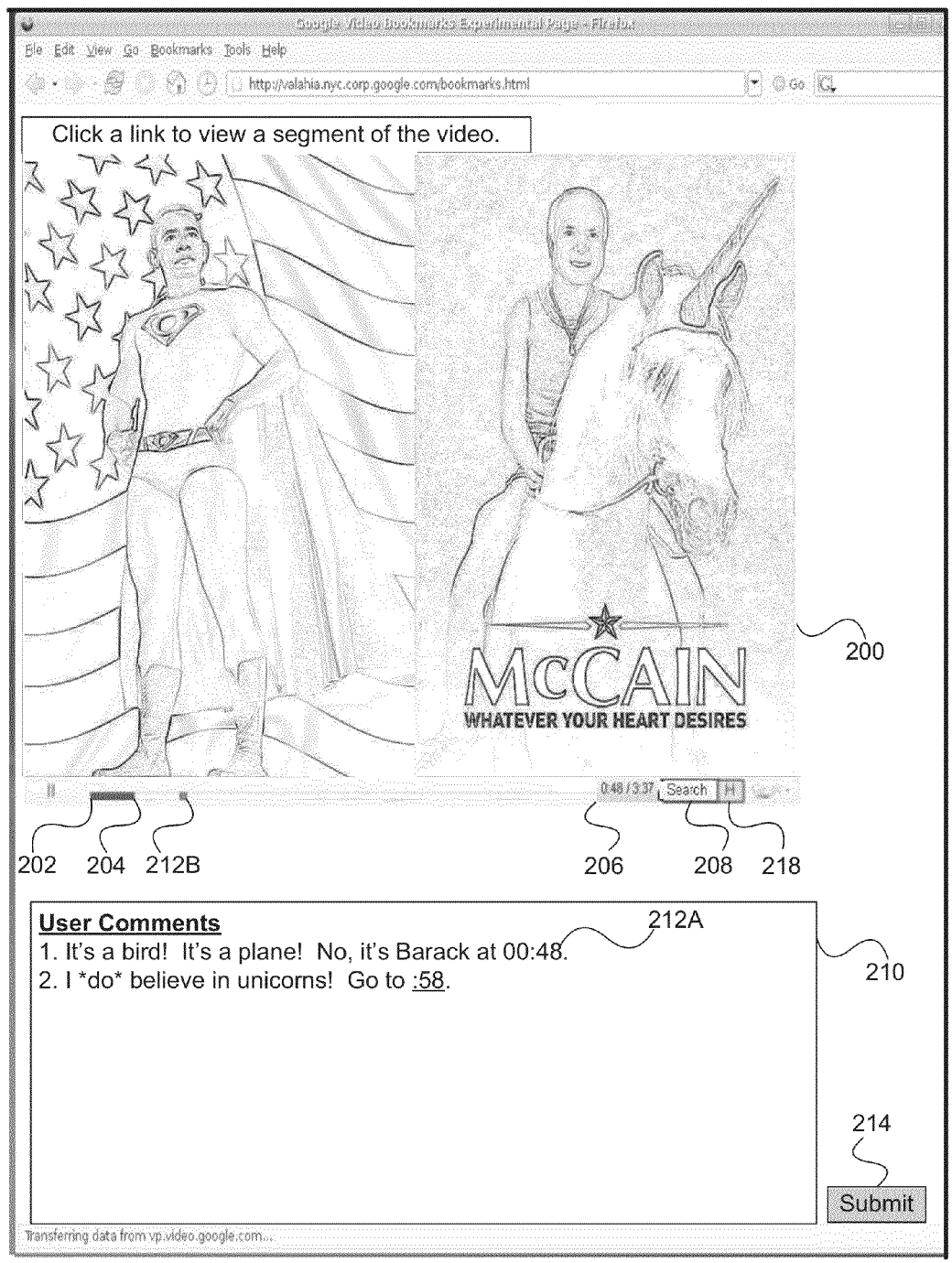
FIG. 2 illustrates a user interface for entering comments for segments of video.

Turning now to FIG. 2, an example of a web page providing a user interface for entering comments and viewing media content from video server 126 by client 130 is depicted. The web page includes a video 200, and may include information about the video, such as the name or user ID of the content provider, the date the video was uploaded, etc. (not shown). The web page also contains a time bar 202, which corresponds to the time duration of the video 200. Video 200 is composed of data that is downloaded from the video database 128 to the embedded player 134 over the network 105. The load point 204 on time bar 202 indicates the current amount of data that has been downloaded. Thus, a user watching video 200 could only watch up to the time represented by load point 204. Similarly, the counter 206 indicates a proportional relationship between the concurrent position of the video 200 being displayed and the time value remaining to the end of the video 200. The user interface also has a search box 208 to allow for searching the content of the comments.

A user enters comments for videos in user comments box 210. In some cases, these comments will provide information about specific segments of the video using a timestamp 212A. A timestamp 212A is any expression that is identifiable as indicating a point in time in the video. Timestamps are identified by using a regular expression algorithm. For example, comment box 210 contains a user comment that includes a timestamp 212A corresponding to a start point 212B on time bar 202. Timestamp 212A ("00:48") follows the regular expression "##:##". It will be understood that other regular expressions exist, such as "#:##" (e.g., "2:19" at FIGS. 4 and 5) and ":##" (e.g., ":58" at FIGS. 4 and 5), as well as other regular expressions not described or depicted here.

The timestamp contains a numerical value that refers to a start point of a segment in video 200 as represented by time bar 202. The value of a timestamp is referred to herein as a "time value". Thus the time value for timestamp 212A is 48 seconds, and the comment "It's a bird! It's a plane! No it's Barack at 00:48" provides information to other users that they should manually drag a slider on the time bar 202 to a segment in the video 200 beginning at 0 minutes, 48 seconds.

FIG. 2 depicts a user interface featuring a comment number 1 that has not yet been submitted, and a timestamp 212A that has not been processed. Generally, users can submit the comments to the video hosting service 108 by clicking the submit button 214.

Figure 3:
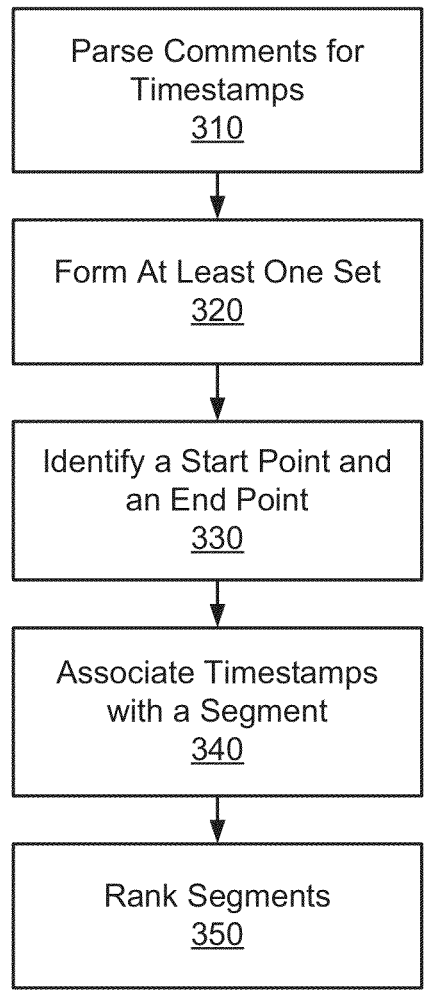
FIG. 3 illustrates a method for associating segments of video with timestamps.

Turning now to FIG. 3, depicted is a method for processing comments. Comments are processed at the time of submission, or at any time thereafter. For example, the comments can be processed once a day. The comments can also be processed after a fixed number of comments are submitted (e.g., 5).

The modules 110-118 of FIG. 1 can be used to carry out the method depicted in FIG. 3. Parsing module 110 parses 310 comment events received from the video access log 129 to identify timestamps. The parsing module 310 can use any of a variety of parsing methods; in one embodiment the parsing module uses a regular expression algorithm. For example, the comment ""It's a bird! It's a plane! No it's Barack at 00:48"" depicted in FIG. 2 can be parsed to identify the timestamp 212A as "00:48".

The timestamps are further processed by the segment identifying module 112 to identify the segments of video indicated by the timestamps. At a high level, identifying the segment of video identified by a single timestamp involves determining a start point and optionally an end point of the segment (i.e., if the end point is the end of the video then no determination of the end point may be necessary).

For any given video, there may be a large number of comments containing timestamps, typically submitted by a number of different users. Some of these comments and their included timestamps will refer to the same segment of video even though the timestamps may be different. For example, two different users may enter a comment about a particular portion of a video, but use different timestamps in their respective comments. For example, referring to the video in FIG. 2, one user may comment ""It's a bird! It's a plane! No it's Barack at 00:48"" and another user may comment "I *do* believe in unicorns! Go to :58." Thus the segment identifying module 112 organizes the timestamps in the comments of a given video into sets where the comments are likely to be referring to a common portion of the video.

Each set includes one or more related timestamps. A set having related timestamps is formed by the methods described below, and a segment of the video is associated with the timestamps in the set. The segment will have a start point determined based upon the timestamps in the set. The segment will have an endpoint that can be either the end of the video itself, or optionally can be determined based on the timestamps. This process can be expanded to determine any number of sets in a given video having related timestamps as desired.

A set of timestamp is formed 320 in a variety of ways. In one embodiment the segment identifying module 112 forms 320 a set based on time intervals from the comment submitted first in time. The segment identifying module 112 forms 320 a set by ordering all of the timestamps for a video from lowest (earliest) to highest (latest) and clustering the timestamps together based on the range of their time values. The segment identifying module 112 iterates through the ordered timestamps T. If a timestamp $T_i$ is within a selected range of a next timestamp $T_{i+1}$, then the segment identifying module 112 determines that the timestamps $T_i$ and $T_{i+1}$ are related, and thus grouped into a set. If $T_{i+1}$ is outside of the selected range from $T_i$, then the segment identifying module 112 initiates a new set starting with $T_{i+1}$.

For example, assume a range of 2 seconds, with the timestamps derived from the comments in a video having the values: 0:12, 0:13, 0:14, 0:14, 0:28, 1:10, 1:12, 1:12, 1:15, 1:17, 1:18, 1:21. Using the above clustering approach the segment identification module 112 would identify five sets as follows: (0:12, 0:13, 0:14, 0:14), (0:28), (1:10, 1:12, 1:12), (1:15, 1:17, 1:18), and (1:21).

The selected range can vary from as little as 0.5 seconds to 10 seconds or more. A low range value results in more, shorter segments, each of which is associated with a relatively smaller number of comments; a large range value results in fewer, longer segments, each of which is associated with a relatively larger number of comments. Thus the selection of the range is decided based on the desired user experience. The range can be fixed value, or it can be dynamically determined for each video as a function of the length of the video, such as N seconds for every M seconds of video (e.g., 1 second for every 20 seconds of video). One of ordinary skill will recognize how this method can be employed to form sets from any number to timestamps.

In another embodiment, segment identifying module 112 forms 320 a set by processing video with one or more scene change algorithms and forming sets based on scene changes. A video can be processed to determine one or more scenes in the video and the timestamps clustered into sets corresponding to one or more of the scenes. More specifically, each identified scene will have a start and end time point, and each timestamp will be associated with the scene so that the timestamp is between the start and end time point. One scene detection algorithm is described in Naphade, M. R., et al., "A High-Performance Shot Boundary Detection Algorithm Using Multiple Cues", 1998 International Conference on Image Processing (Oct. 4-7, 1998), vol. 1, pp. 884-887, which is incorporated by reference herein, though there are many scene detection algorithms known in the art that can be used equally as well.

Another way the segment identifying module 112 forms 320 a set of timestamps is by statistical analysis of data relating to a video. The segment identifying module 112 can fit a probabilistic model to the distribution (e.g., Gaussian distribution) by standard statistical methods, select a mean as the center, and then identifying a set as all the timestamps within a range bound between a certain number (e.g., 1) of intervals (e.g., standard deviations) to either side of the mean. The timestamps are then clustered into sets. One of ordinary skill will recognize how this method can be employed to form sets from any number to timestamps.

Each timestamp is related to a particular segment of the video and can be used to identify a start point and an end point for a segment of video. The process of identifying a start point and an end point for a set of timestamps will now be described in more detail.

Timestamps can be assumed to generally identify the start point for a segment. For example, the comment "It's a bird! It's a plane! No it's Barack at 00:48" contains information directing other users to view the video segment beginning at 0 minutes, 48 seconds. However, when there are number of timestamps clustered together into a set, a start point for the segment associated with the set is determined based upon the timestamps in the set.

The start point for a set of timestamps can be identified 330 in a variety of ways. For example, the segment identifying module 212 identifies 330 the earliest time value in a set as the start point for all timestamps in the set. In another embodiment, the segment identifying module 212 identifies 330 the time stamp submitted first in time as the start point for all the timestamps in the set. Another way the segment identifying module 212 identifies 330 the start point for a set is by determining the average time value in a set of timestamps. Numerous statistical methods exist for calculating the average value of a data set (e.g., arithmetic mean, geometric mean, etc.). The average time value for the set is then identified 330 as the start time for all timestamps in the set. Another embodiment identifies 330 the start point as a fixed number of scene changes before the earliest timestamp in a set.

Unlike start points, user generated comments generally do not contain information about the end point of the video segment being commented upon. In some embodiments the end of the video is the end point for all the timestamps in the set. In other embodiments the end point for a set of timestamps is identified based on the timestamps in the set. The end point for a set of timestamps can be identified 330 in a variety of ways. For example, the segment identifying module 212 can identify 330 the end point for a set of timestamps as some fixed time after the last timestamp in the set. For example, the end point can be identified 330 as being 5 seconds after the last timestamp in every set. Thus if the set is (0:12, 0:13, 0:14, 0:14), then the last timestamp in the set is "0:14" and the end point for the set is identified 330 as "0:19" (i.e., 5 seconds after "0:14"). Another embodiment identifies 330 the end point as a fixed number of scene changes after the last timestamp in a set.

The indexing module 114 creates an index for each video by associating 340 each timestamp with the segment of the video related to the timestamp. The index maps the timestamps to segment of video stored in video database 128. For each timestamp a uniform resource locator ("URL") is created. The URL identifies the start point and the end point of the segment of video in a manner recognized by the video server 126 such that the video server 126 can use the URL to retrieve the segment from the video database 128, or from a cache.

When the timestamps are displayed in a user interface each timestamp can be represented in a distinctive fashion as a timestamp indicator. The indexing module 114 creates at least one indicator for each timestamp (and generally creates one URL for each indicator). Each timestamp indicator can be encoded as a hyperlink or an icon that is coupled to a URL and each URL is encoded to identify the segment associated with the timestamp indicated by the indicator. When a user clicks the timestamp indicator the URL can pass from the embedded player 134 to the video server 126 to request the segment of video from the video database 128. The video server 126 requests the segment of video from the video database 128. The video server 126 can load the video to the embedded player 134 from the start point to the end point. If the segment associated with the indicator has already been prefetched and loaded to the player's cache, then the segment is retrieved from the cache and played back immediately.

Figure 4:
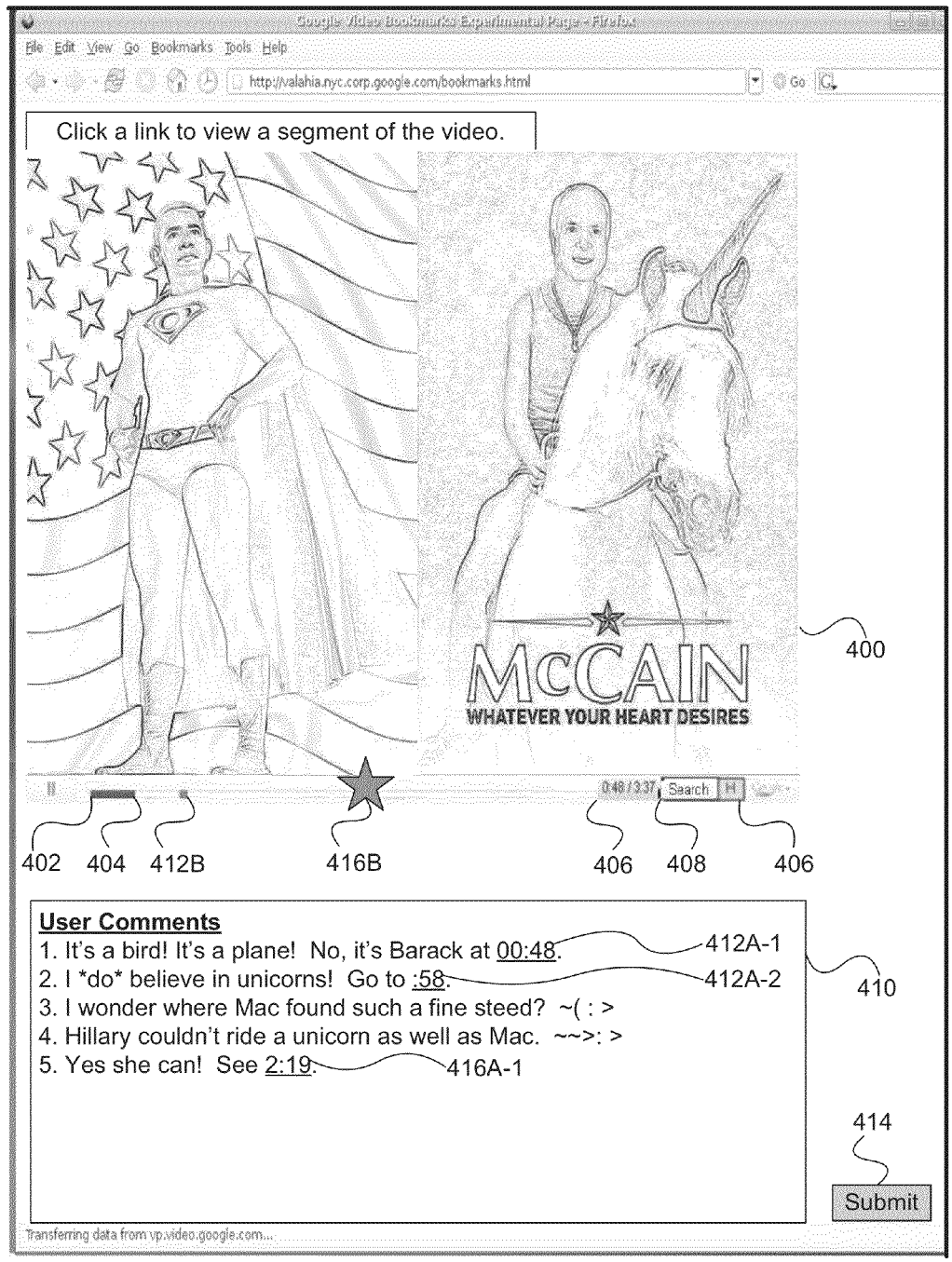
FIG. 4 illustrates a user interface featuring processed comments and indicators of timestamps.

For example, FIG. 2 depicts a comment that contains a timestamp 212A ("00:48") that has not been submitted. Timestamp 212A directs users to a start point 212B in the video 200. Turning now to FIG. 4, depicted is a user interface featuring five submitted comments. Comment 1 in FIG. 4 contains a timestamp indicator 412A-1 ("00:48") that corresponds to timestamp 212 in FIG. 2. Timestamp indicator 412A-1 is underlined to indicate that it is a hyperlink that is coupled to a URL that describes a start point 412B of a segment of video 400. When a user clicks the timestamp indicator 412A-1 the player 134 first checks its cache for the segment; if the segment has been prefetched and loaded, the player immediately plays the segment. Otherwise, the player 134 passes the URL to the video server 126 to request the segment of video 400 from the video database 128. The video server 126 requests the segment of video 400 from the video database 128. The video server 126 loads the segment of video 400 to the embedded player 134 from the start point 412B to the end point.

Similarly, a time bar can be encoded to render a graphical comment indicator that is coupled to a URL that describes a segment of a video that begins at a start point. The comment indicator is generally located at a point along time bar 402 that corresponds to the start point of the segment of video described by the URL. For example, time bar 402 has been encoded to render a comment indicator 416B. Here, timestamp indicator 416A-1 ("2:19") and comment indicator 416B refer to a common segment having a start point at approximate 2 minutes, 19 seconds from the beginning of video 400. Thus, timestamp indicator 416A-1 and comment indicator 416B are both coupled to a URL that describes a segment of video 400 having a start point at approximately 2 minutes, 19 seconds in video 400. When a user clicks comment indicator 416B the URL can pass to the video server 126 to request the segment of video 400 from the video database 128 as described above for timestamp indicator 412A-1.

The process of prefetching based on timestamps will now be described. Assume that a user requests that a video 400 be loaded to an embedded player 134. The display module 118 causes the video server 126 to load the video 400 to the embedded player 134 by opening multiple data streams between the embedded player 134 and the video server 126. A first data stream loads the video 400 from the beginning of the video. Concurrently, one or more secondary data streams load the segments of video 400 that are associated with the timestamps. In addition, the comments associated with the video are also retrieved and loaded into the browser, along with the indicators of the various segments, the indicators including the timestamp indicators and comment indicators. The player begins playback of the video from its beginning using the first data stream. Beneficially, the user can view a segment of video 400 by clicking either a timestamp indicator in the comment box (e.g., timestamp indicator 412A-1) or a comment indicator in the time bar (e.g., comment indicator 412B). If the requested segment of video 400 has finished loading from the video server 126, then the embedded player 134 will play the requested segment of video 400. If, however, the user requests a segment of video 400 before it has finished loading, then the embedded player 134 will play any portion of the requested segment that has loaded while continuing to load the remaining portion of the segment and another other segments. Optionally, the segments can be prefetched and loaded to the client 130 in an order based on rankings assigned to the segments.

The ranking module 116 ranks the segments and the display module 118 loads the user comments. The ranking module 116 ranks 350 segments based on a variety of criteria. The rankings are stored in video database 128. The comments and the indicators are then loaded to the client by display module 118 in the user comment box 410 according to the rank of the segments (e.g., the comment containing the indicator associated with the segment having the highest rank will be listed first in the user comment box 410). Similarly, the video server 126 loads the segments to the client 130 based on the rank of the segments. For example, the ranking module 116 can rank 350 the segments according to the number of clicks received by each associated indicator (i.e. "click popularity"). The segments can be re-ranked in real time or at predetermined intervals based on data stored in video access log 129. Similarly, the segments can also be ranked according to the number of views ("view popularity"). The segments can also be ranked according to the order that the comments were submitted ("timestamp submission time"). The intervals for ranking can be regular or random, and based on time (e.g., time intervals), the number of comment uploads, or any other basis for determining intervals.

Figure 5:
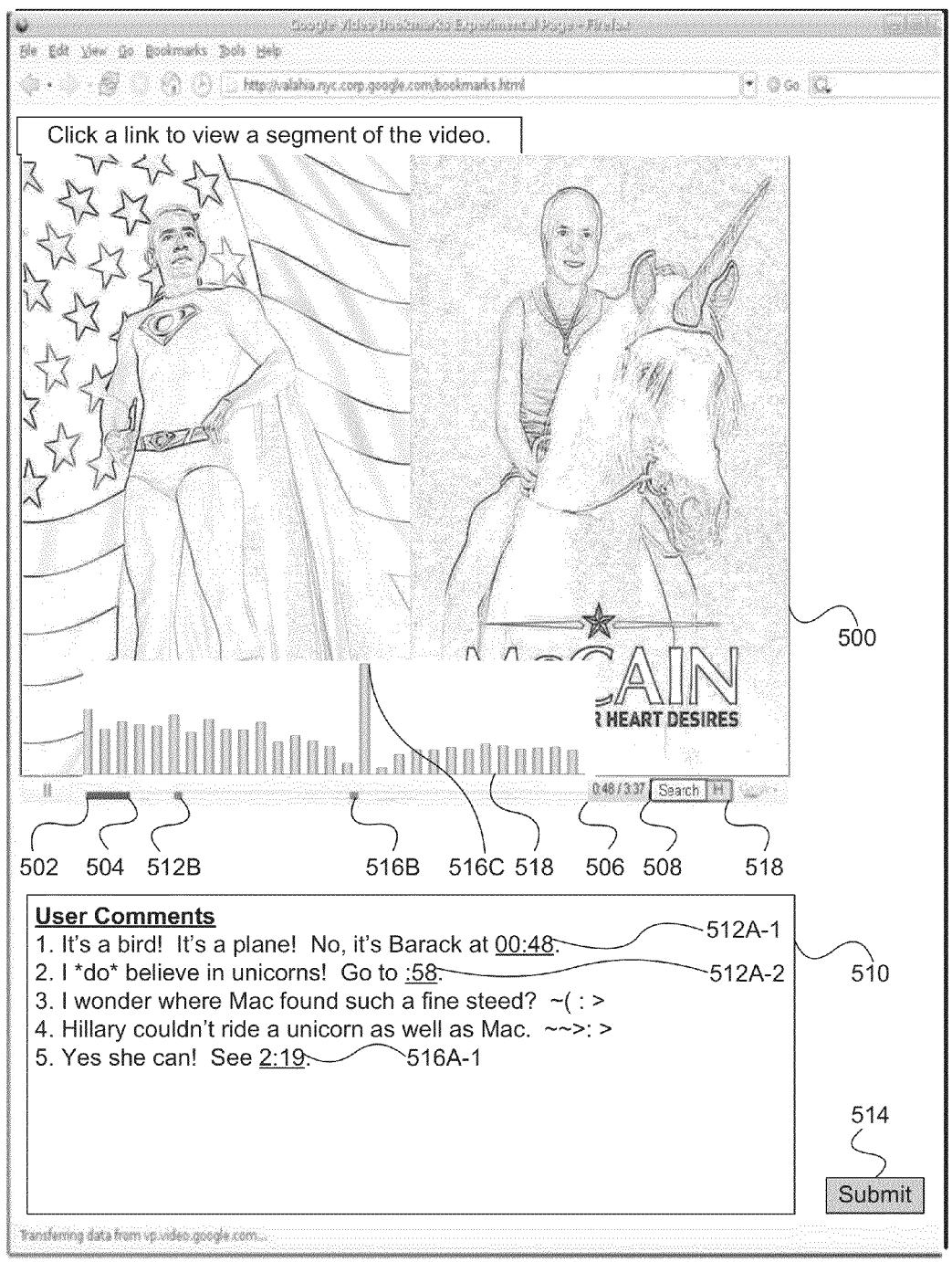
FIG. 5 illustrates a user interface featuring processed comments and indicators of timestamps, including a histogram.

Turning now to FIG. 5, the ranking module 116 can also generate a histogram depicting the popularity of the segments as a function of the time represented by the time bar. A graphic for the histogram can be created by the ranking module 116 or the client 130; the histogram can be created as a data set as well, rather than as a graphic. The histogram can then be loaded to the embedded player 134 by the display module 118. For example, FIG. 5 depicts a user interface featuring a histogram 518 fitted to time bar 502 and depicting the view popularity of a segment of video 500. Here, indicator 516A-1 corresponds to the start point represented by an indicator 516B on time bar 502. Histogram 518 depicts a point in the histogram 516C that represents a segment of video 500 associated with indicator 516A-1.

The user can cycle through the various ranking options described above by clicking the "H" button 518. For example, if a user clicks the "H" button 518 once the comments are displayed according to the order in which they were submitted and a histogram is displayed to depict the view popularity of a segment of video 500. If the user clicks the "H" button 518 a second time the comments are displayed according to view popularity and the histogram is no longer displayed. This process can be continued until the user has cycled through all the available display options.

Figure 6:
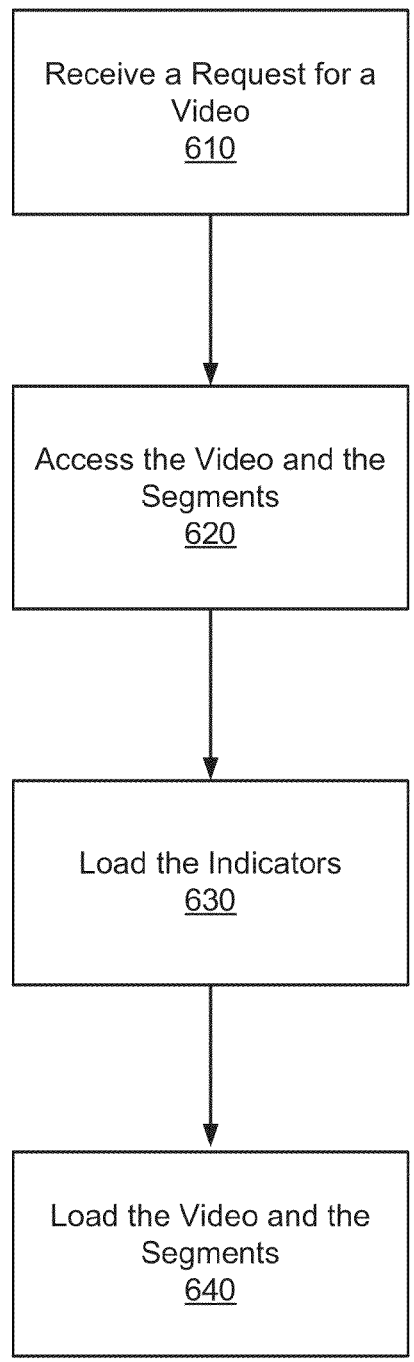
FIG. 6 illustrates a method for prefetching a video segment to a user browser.

The display module 118 loads an indicator and video data to the embedded player 134 according to the method depicted in FIG. 6. Service 108 receives 610 a client request for a video. The request may be received via the Internet from a personal computer, through a cellular network from a telephone or PDA, or by other means for transferring data over network 105 known to those of ordinary skill in the art. The request is relayed to a video server 126. The video server 126 accesses 620 the segments stored in video database 128. The display module 118 loads 630 the indicators to the browser 132 and causes the video server 126 to begin prefetching 640 the segments to the client as described above. During prefetching, the segments of video can be loaded to the browser 132 or the client cache (not pictured). Each segment is generally loaded in sequence from the start point to the end point. One or more segments can be loaded contemporaneously by the secondary data streams. The video server 126 can prefetch the segments in order based on the segment rankings described above. Display module 118 loads the time bar 502, comment box 510, user comments, and the other aspects of the user interface to the client browser 132.

The case of a video server and a client is but one example in which the present invention may be usefully employed for prefetching indicators for video segments. It will be apparent to one of skill in the art that the methods described herein will have a variety of other uses without departing from the scope of the present invention.

The present invention has applicability to any of a variety of hosting models, including but not limited to peer-to-peer, distributed hosting, centralized serving, or other known methods for sharing data over a network.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

I claim:

1. A computer-implemented method for serving videos to clients, the videos having segments based on timestamps, the method comprising:
    receiving a URL from a client;
    accessing a video identified by the URL and a plurality of segments of the video;
    identifying one or more comments associated with the video;
    identifying one or more timestamps, each timestamp associated with at least one of the one or more comments associated with the video;
    opening a first data stream to the client, the first data stream loading the video to the client for display in sequence from a beginning of the video to an end of the video, wherein the video is displayed on the client with the one or more comments associated with the video and indicators of the one or more timestamps;
    concurrent to the first data stream, opening at least one secondary data stream to the client, the at least one secondary data stream including the plurality of segments of the video;
    receiving a selection of an indicator of a time stamp from the one or more indicators of timestamps; and
    transmitting to the client, via the at least one secondary data stream, a segment from the plurality of segments that is associated with the selected indicator of the timestamp responsive to the selection, the transmitted segment displayed from a start point of the segment to an end point of the segment.

2. The method of claim 1, wherein the indicators are graphical comment indicators encoded in a time bar of an embedded video player.

3. The method of claim 1, wherein the indicators are timestamp indicators encoded in a comment box of an embedded video player.

4. The method of claim 1, wherein the indicators are graphical comment indicators encoded in a time bar of an embedded video player and timestamp indicators encoded in a comment box of an embedded video player.

5. The method of claim 1, wherein the plurality of segments are transmitted to the client in an order based on a rank for each segment.

6. The method of claim 5, wherein the rank of the plurality of segments is based on a click popularity.

7. The method of claim 5, wherein the rank of the plurality of segments is based on a view popularity.

8. The method of claim 5, wherein the rank of the plurality of segments is based on a timestamp submission time.

9. The method of claim 1, wherein the plurality of segments are transmitted to a cache of the client.

10. The method of claim 1, wherein the plurality of segments are transmitted to a browser of the client.

11. The method of claim 5, further comprising:
    generating a histogram depicting a popularity of the indicators at one or more time intervals in the video; and
    transmitting the histogram to the client.

12. A computer system for serving videos to clients, the videos having segments based on timestamps, the computer system comprising:
    a computer processor; and
    a non-transitory computer-readable storage medium storing executable code, the code when executed by the computer processor causes the computer processor to perform steps comprising:
        receiving a URL from a client;
        accessing a video identified by the URL and a plurality of segments of the video;
        identifying one or more comments associated with the video;
        identifying one or more timestamps, each timestamp associated with at least one of the one or more comments associated with the video;
        opening a first data stream to the client, the first data stream loading the video to the client for display in sequence from a beginning of the video to an end of the video, wherein the video is displayed on the client with the one or more comments associated with the video and indicators of the one or more timestamps;
        concurrent to the first data stream, opening at least one secondary data stream to the client, the at least one secondary data stream including the plurality of segments of the video;
        receiving a selection of an indicator of a time stamp from the one or more indicators of timestamps; and transmitting to the client, via the at least one secondary data stream, a segment from the plurality of segments that is associated with the selected indicator of the timestamp responsive to the selection, the transmitted segment displayed from a start point of the segment to an end point of the segment.

13. The system of claim 12, wherein the indicators are graphical comment indicators encoded in a time bar of an embedded video player.

14. The system of claim 12, wherein the indicators are timestamp indicators encoded in a comment box of an embedded video player.

15. The system of claim 12, wherein the indicators are graphical comment indicators encoded in a time bar of an embedded video player and timestamp indicators encoded in a comment box of an embedded video player.

16. The system of claim 12, wherein the code when executed by the computer processor performs further steps comprising:
ranking the plurality of segments based on a criteria and assigning a rank to each segment.

17. The system of claim 16, wherein the plurality of segments are loaded to the client in an order based on the rank for each segment.

18. The system of claim 16, wherein the ranking of the plurality of segments is based on a click popularity.

19. The system of claim 16, wherein the ranking of the plurality of segments is based on a view popularity.

20. The system of claim 16, wherein the ranking of the plurality of segments is based on a timestamp submission time.

21. The system of claim 16, wherein the code when executed by the computer processor performs further steps comprising:
generating a histogram depicting a popularity of the plurality of segments at one or more time intervals in the video; and
loading the histogram to the client.

22. The system of claim 12, wherein the plurality of segments are loaded to a cache of the client.

23. The system of claim 12, wherein the plurality of segments are loaded to a browser of the client.

24. A computer program product for serving videos having segments based on timestamps, comprising a non-transitory computer readable storage medium storing computer code, the code when executed performs steps comprising:
receiving a URL from a client;
accessing a video identified by the URL and a plurality of segments of the video;
identifying one or more comments associated with the video;
identifying one or more timestamps, each timestamp associated with at least one of the one or more comments associated with the video;
opening a first data stream to the client, the first data stream loading the video to the client for display in sequence from a beginning of the video to an end of the video, wherein the video is displayed on the client with the one or more comments associated with the video and indicators of the one or more timestamps;
concurrent to the first data stream, opening at least one secondary data stream to the client, the secondary data stream including the plurality of segments of the video;
receiving a selection of an indicator of a timestamp from the one or more indicators of timestamps; and
transmitting to the client, via the at least one secondary data stream, a segment from the plurality of segments that is associated with the selected indicator of the timestamp responsive to the selection, the transmitted segment displayed from a start point of the segment to an end point of the segment.

25. The computer program product of claim 24, wherein the indicators are graphical comment indicators encoded in a time bar of an embedded video player.

26. The computer program product of claim 24, wherein the indicators are timestamp indicators encoded in a comment box of an embedded video player.

27. The computer program product of claim 24, wherein the indicators are graphical comment indicators encoded in a time bar of an embedded video player and timestamp indicators encoded in a comment box of an embedded video player.

28. The computer program product of claim 24, wherein the plurality of segments are transmitted to a cache of the client.

29. The computer program product of claim 24, wherein the plurality of segments are transmitted to a browser of the client.

30. The computer program product of claim 24, wherein the plurality of segments are transmitted to the client in an order based on a rank for each segment.

31. The computer program product of claim 30, wherein the rank of the plurality of segments is based on a click popularity of the indicators.

32. The computer program product of claim 30, wherein the rank of the plurality of segments is based on is a view popularity.

33. The computer program product of claim 30, wherein the rank of the plurality of segments is based on a timestamp submission time.

34. The computer program product of claim 24, wherein the computer code when executed performs further steps comprising:
generating a histogram depicting a popularity of the indicators at one or more time intervals in the video; and
transmitting the histogram to the client.

\* \* \* \* \*